US009016664B1

(12) United States Patent
Powers et al.

(10) Patent No.: US 9,016,664 B1
(45) Date of Patent: Apr. 28, 2015

(54) SPIN STAND DEVICE

(76) Inventors: William J. Powers, Rockford, IL (US); Thomas G. Engelbrecht, Rockford, IL (US)

(*) Notice: Subject to any disclaimer, the term of this patent is extended or adjusted under 35 U.S.C. 154(b) by 988 days.

(21) Appl. No.: 13/134,679

(22) Filed: Jun. 14, 2011

(51) Int. Cl.

| | |
|---|---|
| ***B66F 5/02*** | (2006.01) |
| ***B66F 3/24*** | (2006.01) |
| ***B60P 1/48*** | (2006.01) |
| ***B25B 1/22*** | (2006.01) |
| ***B23Q 1/64*** | (2006.01) |
| *B05C 13/02* | (2006.01) |
| *B25H 1/00* | (2006.01) |

(52) U.S. Cl.
CPC ............... *B05C 13/02* (2013.01); *B25H 1/0007* (2013.01)

(58) Field of Classification Search
USPC .................. 254/2 R, 2 B, 8 R; 269/71, 57, 17
See application file for complete search history.

(56) References Cited

U.S. PATENT DOCUMENTS

| | | | | | |
|---|---|---|---|---|---|
| 2,763,236 | A * | 9/1956 | Cummings | 118/69 |
| 2,803,872 | A * | 8/1957 | Massa | 269/37 |
| 3,266,634 | A * | 8/1966 | Tintary | 211/131.1 |
| 4,756,429 | A * | 7/1988 | Lehman et al. | 211/43 |
| 4,838,199 | A * | 6/1989 | Weber | 118/500 |
| 5,127,359 | A * | 7/1992 | Kannari et al. | 118/56 |
| 5,141,211 | A | 8/1992 | Adams, Jr. | |
| 5,240,745 | A | 8/1993 | Yamamoto et al. | |
| 5,707,450 | A | 1/1998 | Thompson | |
| 6,024,348 | A * | 2/2000 | Ventura et al. | 269/17 |
| 6,036,779 | A * | 3/2000 | Tolbert | 118/500 |
| 6,173,947 | B1 | 1/2001 | Johnson | |
| 6,296,239 | B1 * | 10/2001 | Sawyer | 269/17 |
| 6,409,128 | B1 | 6/2002 | Deshler | |
| 6,443,371 | B1 | 9/2002 | Arnfindsen | |
| 6,673,215 | B2 * | 1/2004 | DeWent | 204/164 |
| 7,445,184 | B1 * | 11/2008 | Johnson | 248/176.1 |
| 7,448,606 | B1 | 11/2008 | Johnson | |
| 7,622,158 | B2 | 11/2009 | Clifford et al. | |
| 7,727,581 | B2 * | 6/2010 | Jallouli et al. | 427/162 |
| 7,950,635 | B2 * | 5/2011 | Proehl | 269/17 |
| 7,988,137 | B2 * | 8/2011 | Johnson | 269/16 |
| 8,066,267 | B2 * | 11/2011 | Schaerer | 269/17 |
| 8,245,856 | B1 * | 8/2012 | Pappin et al. | 211/13.1 |
| 8,328,173 | B1 * | 12/2012 | DesForge et al. | 269/71 |
| 2002/0007703 | A1 * | 1/2002 | Michel Gelos | 81/385 |
| 2007/0022950 | A1 * | 2/2007 | Livingston | 118/500 |
| 2009/0184217 | A1 * | 7/2009 | Sprout | 248/124.1 |
| 2009/0269170 | A1 * | 10/2009 | Bradsher | 414/147 |
| 2011/0101586 | A1 * | 5/2011 | Lands et al. | 269/57 |

FOREIGN PATENT DOCUMENTS

| | | | |
|---|---|---|---|
| DE | 102008050435 B3 * | 1/2010 |
| WO | WO 2005089956 A1 * | 9/2005 |

OTHER PUBLICATIONS www.innovativetools.com. Innovative UltraRack tm, Innovative Octopus tm, Innovative Superstand tm.
http://automotive-paint-stands.brutmfg.com, Brut Paint Stick Model #PS98.
http://www2.northerntool.com/auto-repair/auto-body-repair/item-800350.htm, Torin Big Red Rotating Paint Rack, Model#RM350.
http://www.autobodytoolmart.com/pc-11681-484-astro-universal-super-stand-7300.aspx, Astro Universal Super Stand-7300.

* cited by examiner

*Primary Examiner* — Lee D Wilson
*Assistant Examiner* — Alvin Grant
(74) *Attorney, Agent, or Firm* — Mathew R. P. Perrone, Jr.

(57) ABSTRACT

A spin stand device has an adjustable base frame to allow width and depth profile adjustments and a multitude of mounting accessories which can account for efficiently painting a body part or item of many different types, makes, models, and years of vehicles; with minimized drying time and greatly reduced painting time due to the variety of positions achievable during the painting process.

15 Claims, 21 Drawing Sheets

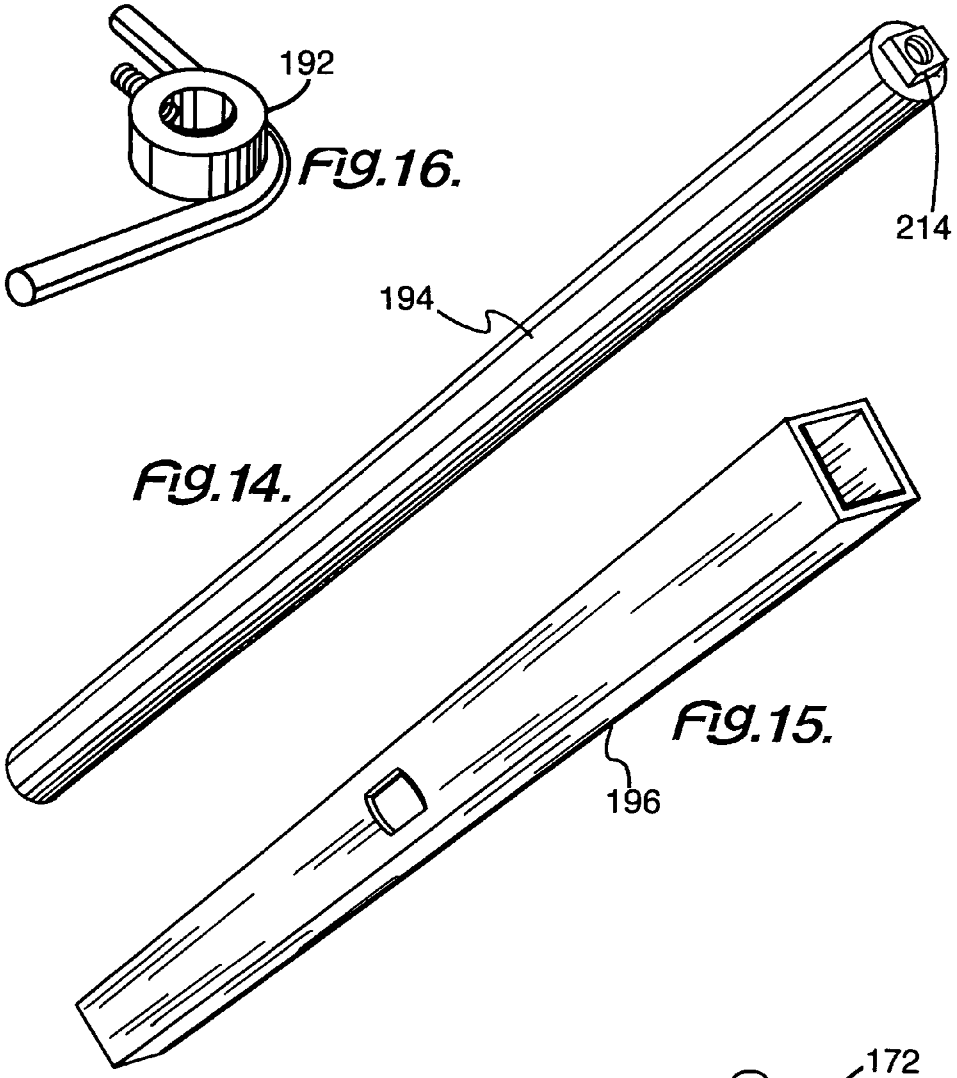
Fig.16.
Fig.14.
Fig.15.
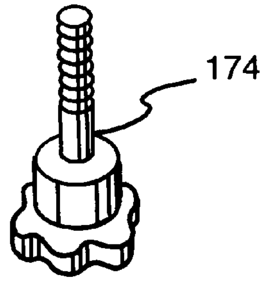
Fig.17.
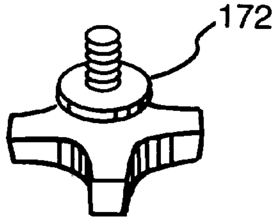
Fig.18.

SPIN STAND DEVICE

This invention relates to a spin stand device and more particularly to a spin stand device which holds a large variety of vehicle parts and allows every portion to be painted without removing the part from the spin stand device.

BACKGROUND OF THE INVENTION

Vehicles, including trucks, sports utility vehicles, vans, cars, and any other vehicle, are exposed to environmental wear and tear including, but not limited to, salt on the roads, hail, sun damage, snow, ice, and rain. Furthermore, vehicles can have the paint damaged due to crashes or to a lesser extent, car doors hitting other cars in parking lots or shopping carts colliding with cars. All of these factors can damage the paint job on a car and require repair. Also, owners may want to change the color of a car during their ownership which also requires a new paint job.

Painting any portion of a vehicle is a difficult task. Vehicle parts are heavy and bulky and therefore cumbersome to handle. Lifting of a vehicle part usually requires the help of at least two people. The vehicle part has to be moved a minimum of two times during the painting process because the part has to be painted then lifted, once the original paint dries, to paint the other side. A device that will minimize the amount of lifting is a useful invention.

Moreover, painting a vehicle part is a time consuming process. The vehicle part must be positioned to be painted and then painted. Then, the vehicle part must be put through a drying cycle to allow the paint to dry. Then, the vehicle part must be repositioned to allow the other side of the vehicle part to be painted and put through yet another drying cycle. This process is required because not every portion of the vehicle part can be exposed for painting in a single step. An invention that allows the entire vehicle part to be painted all at once and requires only one drying cycle or period is a very useful invention.

SUMMARY OF THE INVENTION

Among the many objectives of this invention is the provision of a spin stand that can securely hold a vehicle part, yet allow the entire area of the vehicle part to be exposed for painting.

A further objective of the present invention is the provision of a spin stand that can allow for every portion of a vehicle part to be painted without the need to remove the part from the spin stand.

A still further objective of the present invention is the provision of a spin stand that can allow every portion of a vehicle part to be painted, in its entirety, without the need to allow one portion to dry, reposition, and then paint a second portion.

Yet another objective of the present invention is the provision of a spin stand that can allow a vehicle part to be painted without the need for two or more drying cycles or periods.

Moreover an objective of the present invention is the provision of a spin stand which is compactly foldable for storage when the spin stand is not in use.

Also, an objective of the present invention is the provision of a spin stand that can have its width and depth profiles increased or decreased based on the needs of the item or vehicle part being held.

A still further objective of the present invention is the provision of spin stand that can adjust for a multitude of makes, types, models and years of vehicles.

Moreover, another objective of the present invention is the provision of a spin stand that can reduce the amount of times the vehicle part needs to be lifted or turned.

Yet, another objective of the present invention is the provision of a spin stand that can reduce the overall amount of time required to paint the vehicle part.

Also, another objective of the present invention is the provision of a spin stand which can hold and position the vehicle part during all stages of restoration including, but not limited to, cleaning, disassembling, repairing, sanding, filling, hammering, reshaping, painting, reassembling, and other vehicle body shop functions.

A still further objective of the present invention is the provision of a spin stand which can be moved into the paint drying mechanism or area and utilize the paint drying equipment without removing the vehicle part from the spin stand.

Moreover, another objective of the present invention is the provision of a spin stand which has a variety of attachments to aide in loading bulky, cumbersome, or heavy vehicle parts to allow the job to be performed by a single person.

These and other objectives of the invention (which other objectives become clear by consideration of the specification, claims and drawings as a whole) are met by providing a spin stand having an adjustable base frame to allow width and depth profile adjustments and a multitude of mounting accessories which can account for different types, makes, models, and years of vehicles.

BRIEF DESCRIPTION OF DRAWINGS

FIG. 14 depicts a side perspective view of slave side support bar 194.

FIG. 15 depicts a side perspective view of support channel 196.

FIG. 16 depicts a front perspective view of hood strut 192.

FIG. 17 depicts a bottom perspective view of mount locking knob 174.

FIG. 18 depicts a bottom perspective view of base locking knob 172.

Throughout the figures of the drawings, where the same part appears in more than one figure of the drawings, the same number is applied thereto.

DESCRIPTION OF THE PREFERRED EMBODIMENTS

Figure 1:
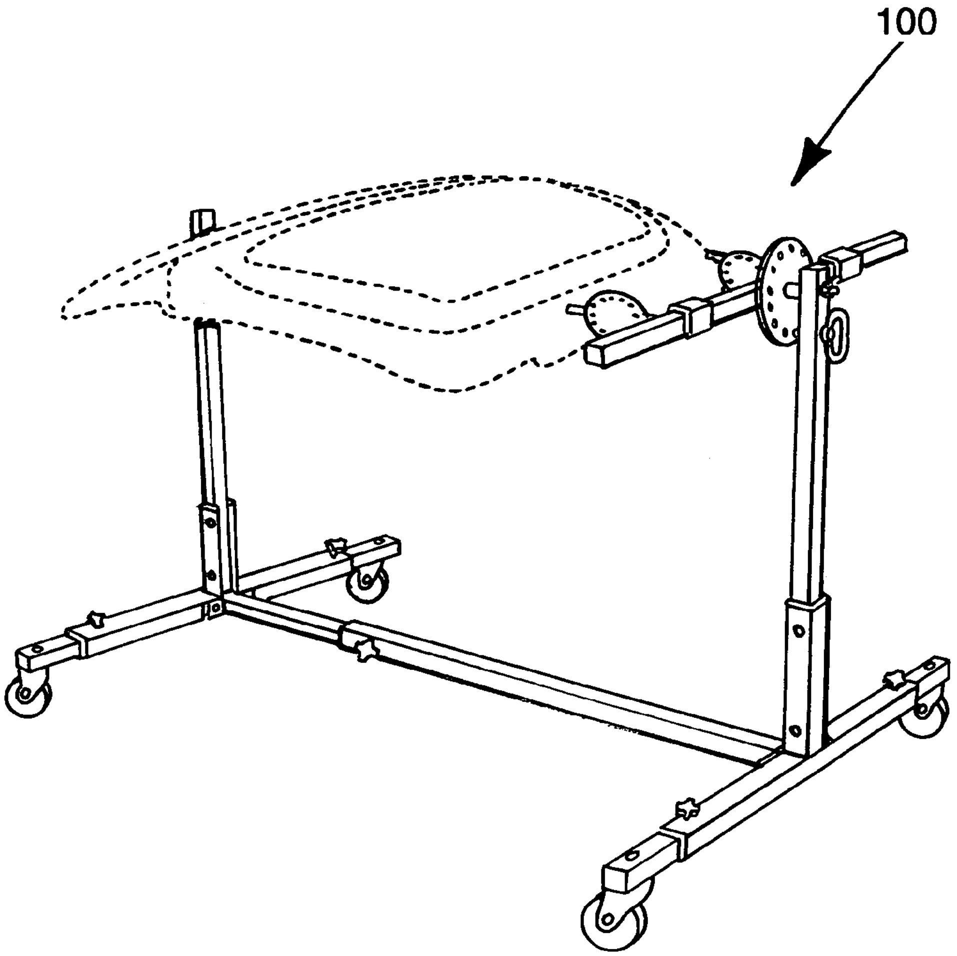
FIG. 1 depicts a perspective view of spin stand 100 with latch door 110 depicted in phantom.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

The spin stand of this invention permits the painting of a vehicle body part with minimized handling of that part. When the part is mounted on the spin stand, all or almost all areas of the part can be painted at once. This feature minimizes downtime, especially the downtime caused by painting the part, allowing the paint to dry, repositioning the part to paint another area, allowing the paint to dry on the second area, and repeating these steps until the part is fully painted and dried.

Now referring to FIG. 1, the structure of spin stand 100 can be clearly seen. Spin stand 100 holds latch door 110 so that both sides may be painted simultaneously. Spin stand 100 makes the painting process much more efficient as only one drying cycle or period is required. In the prior art, one side of the latch door or other vehicle part was painted and dried and then, the second side was painted and dried. Thus, the prior art required two drying cycles or periods which required much more time and was much less efficient.

Figure 2:
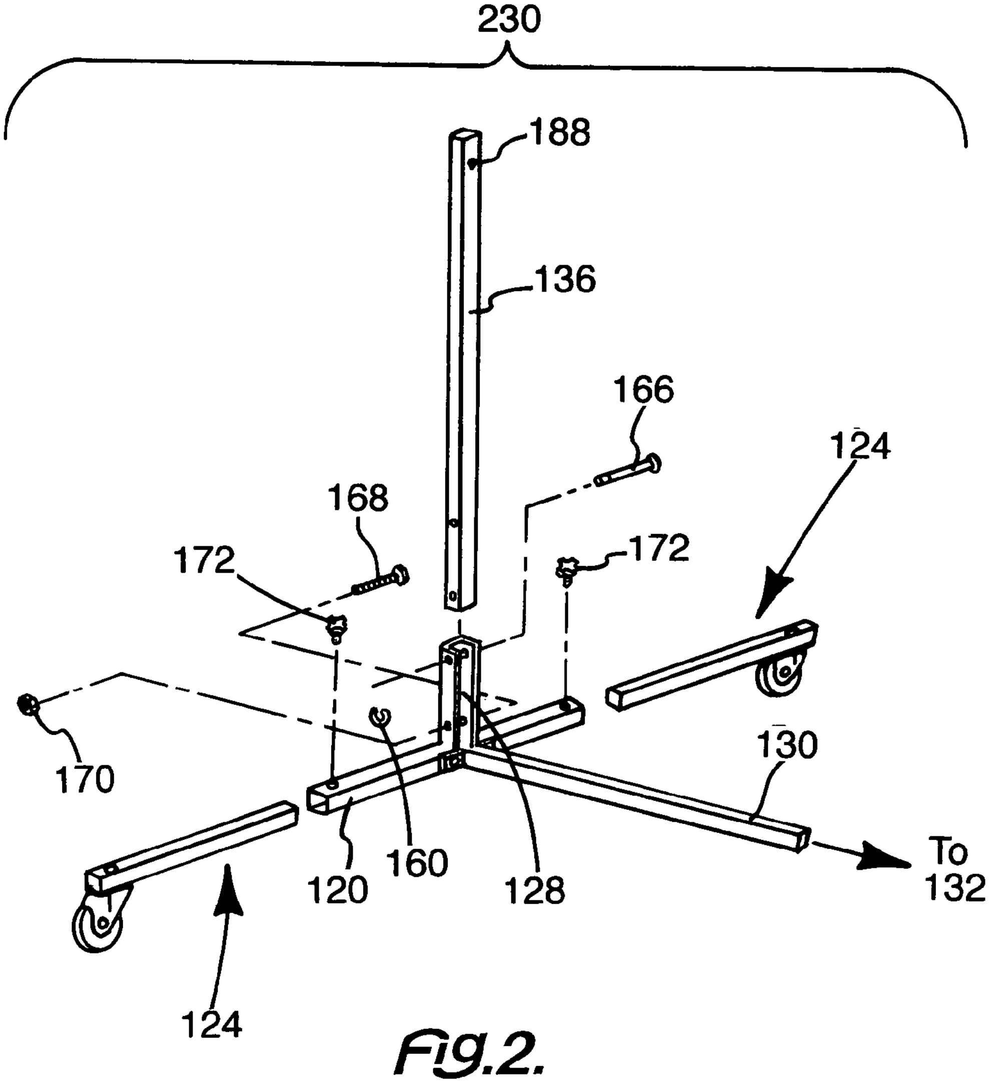
FIG. 2 depicts a left perspective, exploded view of spin stand 100.
Figure 3:
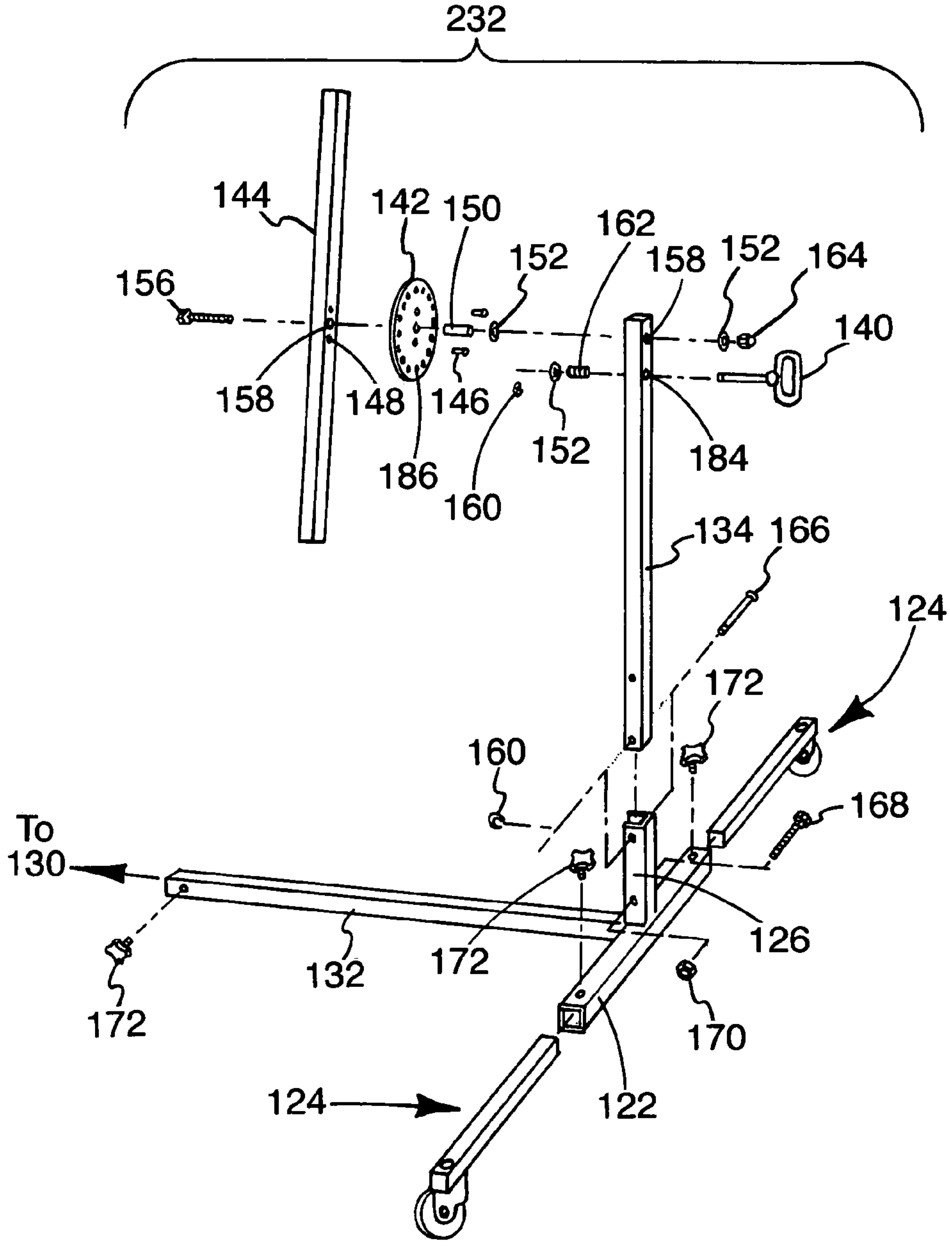
FIG. 3 depicts a right perspective, exploded view of spin stand 100.
Figure 4:
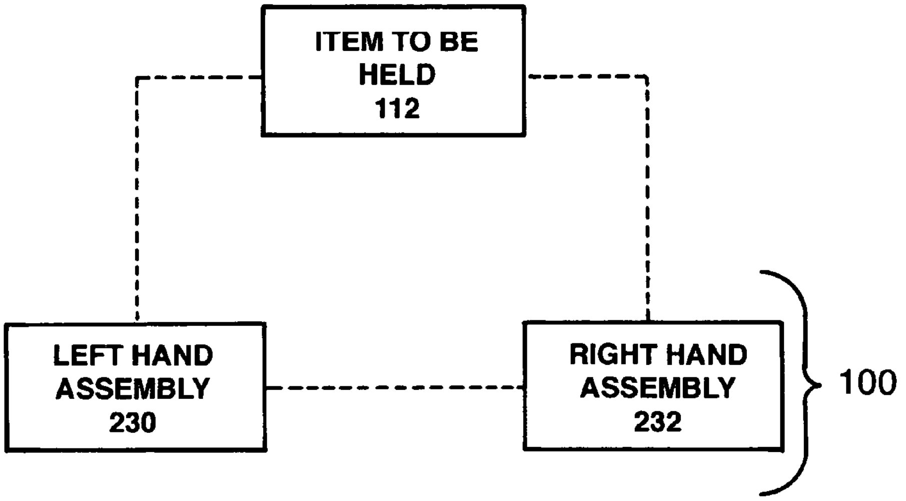
FIG. 4 depicts a block diagram of spin stand 100.

Now adding FIG. 2, FIG. 3, and FIG. 4 to the consideration, the structure of spin stand 100 can be more clearly seen. Spin stand 100 has a left hand assembly 230 connected to a right hand assembly 232. Left hand assembly 230 and right hand assembly 232 cooperate and hold item 112. Left base end 120 has inner center support 130 extending perpendicularly, from the side, and right base end 122 has outer center support 132 extending perpendicularly, from the side. Inner center support 130 attaches and inserts into outer center support 132 to connect left hand assembly 230 to right hand assembly 232. The connection between inner center support 130 and outer center support 132 is secured by base locking knob 172. Spin stand 100 can have an increased depth to account for larger items 112 by decreasing the distance inner center support 130 is inserted into outer center support 132. In contrast, spin stand 100 can have a decreased depth to account for smaller items 112 by increasing the distance inner center support 130 is inserted into outer center support 132.

Left hand assembly 230 has a left base end 120 which is connected to a castor assembly 124 on opposing ends. Second support post bracket 128 attaches perpendicularly, on the upper side, to left base end 120. Second support post 136 inserts into and attaches to second support post bracket 128 in a male to female relationship. Second support post 136 is secured to second support post bracket 128 through the cooperation of hinge bolt 168 with hinge nut 170 and lock pin 166 with cotter pin 160.

When spin stand 100 is in use, both hinge bolt 168 with hinge nut 170 and lock pin 166 with cotter pin 160 are secured in place. When spin stand 100 is stored, only the hinge bolt 168 with hinge nut 170 are in place so that second support post 136 may fold downward. Lock pin 166 with cotter pin 160 are secured in an unused aperture so that they are easily accessible when spin stand 100 is needed. Thus, the hinging capability provides great flexibility and saving of storage space.

Base locking knob 172 cooperates with castor assembly 124 to allow the castor assembly 124 to be moved outward, from left base end 120, to increase the width profile to add stability and security for larger items 112. In contrast, castor assembly 124 can be moved further into left base end 120 to decrease the width profile to provide more flexibility and maneuverability for smaller items 112.

Figure 10:
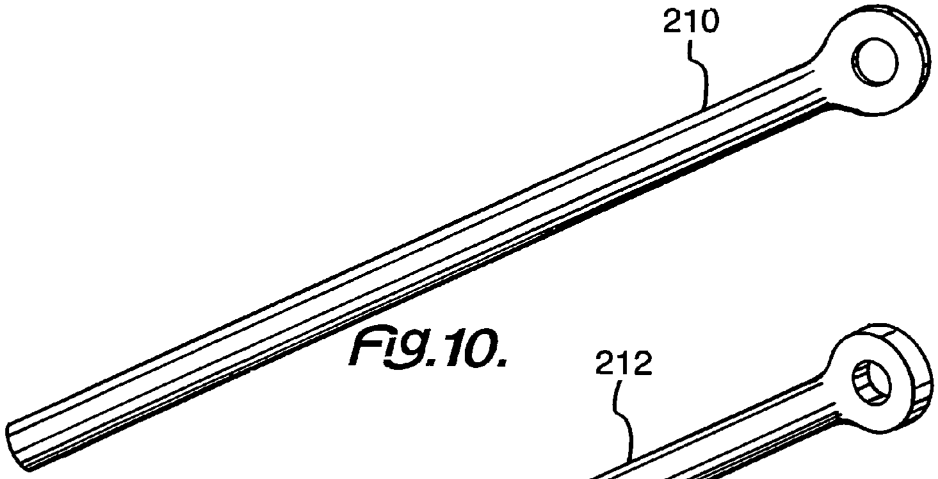
FIG. 10 depicts a side perspective view of flat door or hood mount 210.
Figure 11:
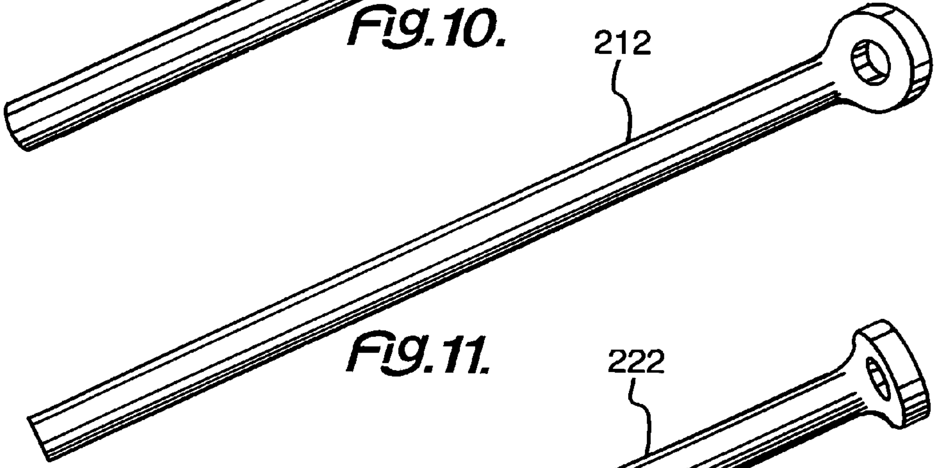
FIG. 11 depicts a side perspective view of 30 degree door or hood mount 212.
Figure 12:
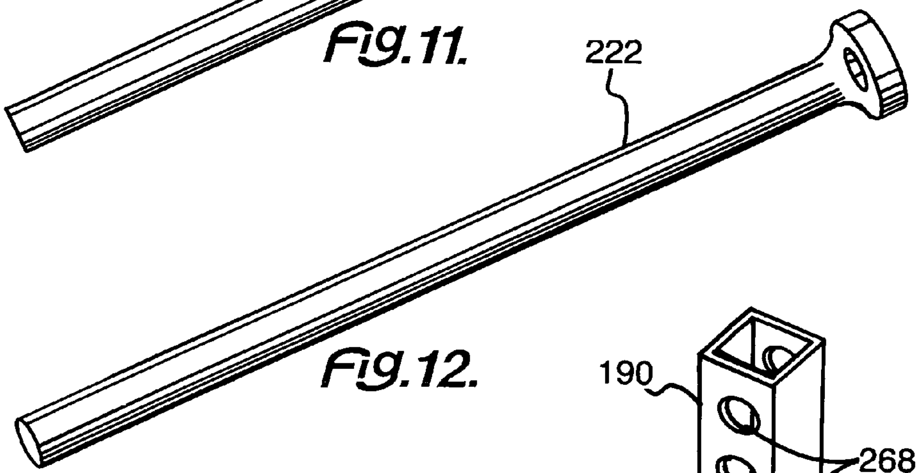
FIG. 12 depicts a side perspective view of 90 degree door or hood mount 222.
Figure 36:
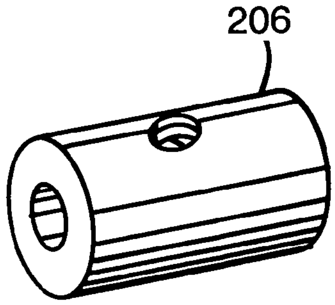
FIG. 36 depicts side perspective view of bushing 206.

Second support post 136 has accessory aperture 188. Flat door or hood mount 210 (see FIG. 10), 30 degree door or hood mount 212 (see FIG. 11), 90 degree door or hood mount 222 (see FIG. 12), and slave side support bar 194 (see FIG. 14) can be attached to second support post 136 through cooperation with accessory aperture 188. Bushings 206 (see FIG. 36) can be used on both sides of second support post 136 to secure the connection.

Right hand assembly 232 has right base end 122. A castor assembly 124 inserts into oppositely disposing ends of right base end 122 and the connection is secured with base locking knob 172. Again, the width profile can be adjusted by increasing or decreasing the distance castor assembly 124 is inserted into right base end 122.

Right base end 122 has first support post bracket 126 extending perpendicularly, from the top side thereof. First support post 134 attaches and inserts into first support post bracket 126 in a male to female relationship. First support post 134 is secured to first support post bracket 126 through the cooperation of hinge bolt 168 with hinge nut 170 and lock pin 166 with cotter pin 160. Again, the removal of lock pin 166 and cotter pin 160 allows first support post 134 to fold downward for storage.

First support post 134 attaches to swing arm 144. Positioning disk 142 attaches to swing arm 144 and is secured by fasteners 146. Fasteners 146 can be screws, rivets, or any other suitable fastening mechanism. Swing arm 144 attaches to positioning disk 142 and first support post 134 through cooperation with positioning disk bolt 156, disk apertures 158, spacer bushing 150, washers 152, and lock nut 164.

Hitch pin 140 is inserted into first support post 134 through pin aperture 184 and positioning disk 142 through positioning disk apertures 158. When hitch pin 140 is pulled outward, it releases from positioning disk 142 through cotter pin 160 and washer 152 compressing spring 162. Positioning disk 142 is adjusted to the desired position and hitch pin 140 is released, spring 162 is decompressed and hitch pin 140 once again inserts into the desired positioning aperture 186. This interaction allows item 112 to be rotated and properly positioned for painting.

Figure 5:
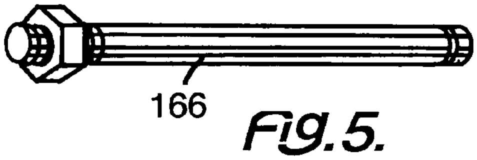
FIG. 5 depicts a side perspective view of lock pin 166.
Figure 6:
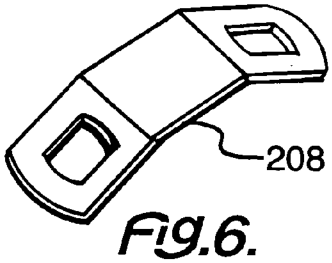
FIG. 6 depicts a front perspective view of spring clip 208.
Figure 7:
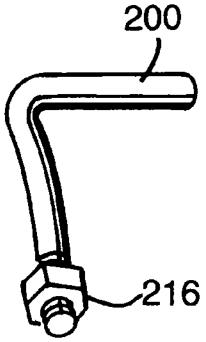
FIG. 7 depicts a top perspective view of right latch bolt 200.
Figure 8:
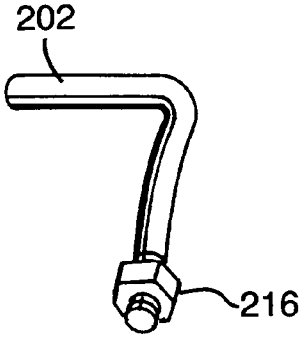
FIG. 8 depicts a top perspective view of left latch bolt 202.
Figure 9:
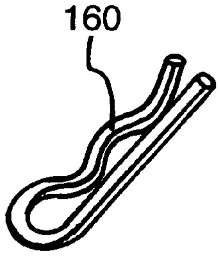
FIG. 9 depicts a side perspective view of cotter pin 160.
Figure 13:
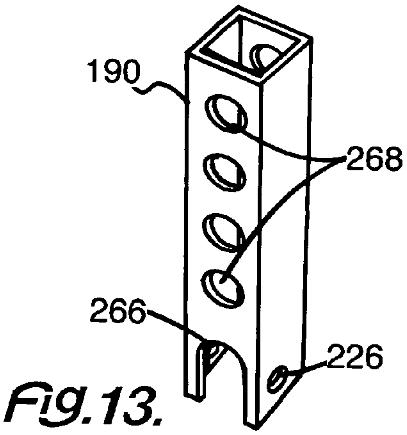
FIG. 13 depicts a top perspective view of hood latch adapter 190.
Figure 19:
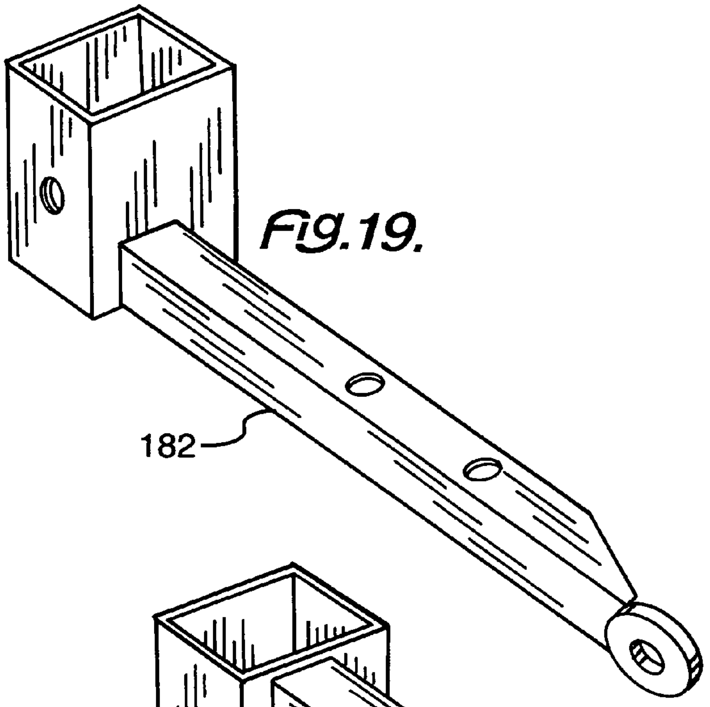
FIG. 19 depicts a top perspective view of left door hinge mount 182.
Figure 20:
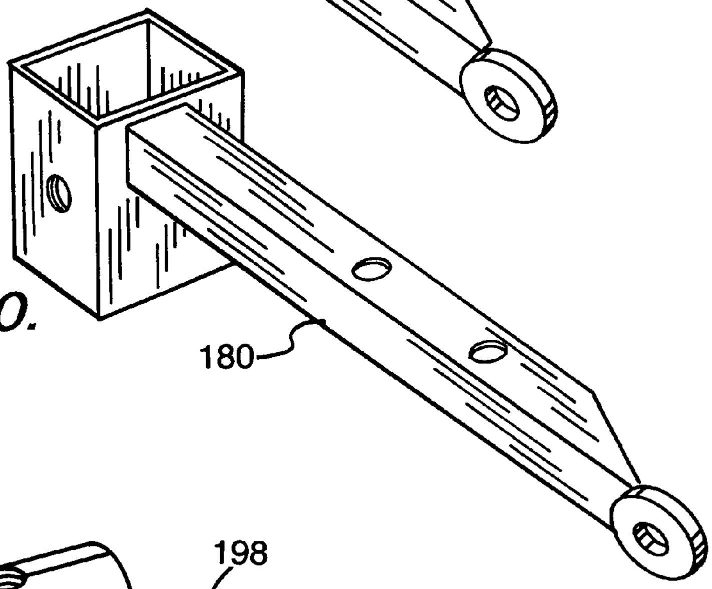
FIG. 20 depicts a top perspective view of right door hinge mount 180.
Figure 21:
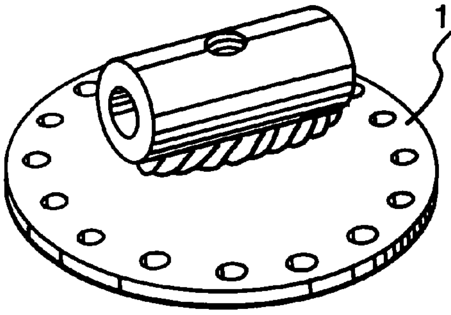
FIG. 21 depicts a side perspective view of multiple position door hinge mount 198.

Now adding FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, and FIG. 34 to the consideration the adjustability and flexibility of spin stand 100 can be clearly seen. These drawings depict different attachment and positioning pieces which allow spin stand 100 to account for different vehicle parts and for different makes and models. These pieces, FIG. 5 (lock pin 166), FIG. 6 (spring clip 208), FIG. 7 (right latch bolt 200), FIG. 8 (left latch bolt 202), FIG. 9 (cotter pin 160), FIG. 10 (flat door or hood mount 210), FIG. 11 (30 degree door or hood mount 212), FIG. 12 (90 degree door or hood mount 222), FIG. 13 (hood latch adapter 190), FIG. 14 (slave side support bar 194), FIG. 15 (support channel 196), FIG. 16 (hood strut 192), FIG. 17 (mount locking knob 174), FIG. 18 (base locking knob 172), FIG. 19 (left door hinge mount 182), FIG. 20 (right door hinge mount 180), FIG. 21 (multiple position door hinge mount 198), and FIG. 36 (bushing 206), allow spin stand 100 to accommodate a variety of vehicles, vehicle pieces or parts, and vehicle makes and models.

Figure 22:
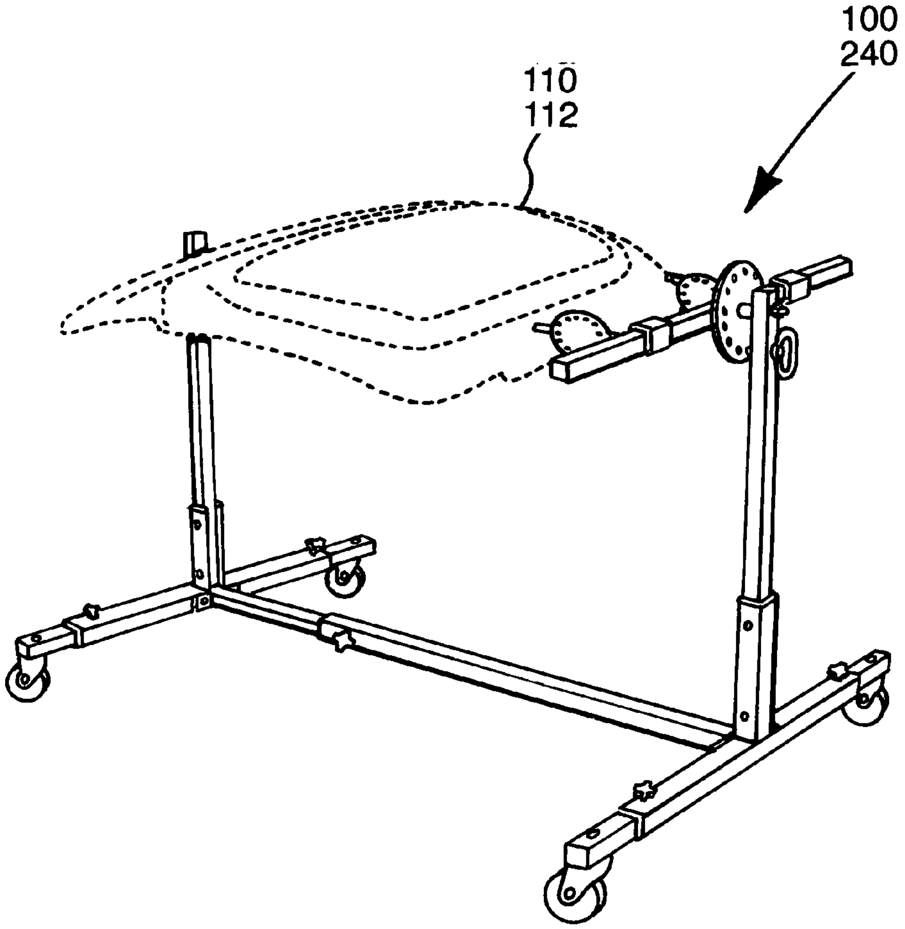
FIG. 22 depicts a front perspective view of spin stand 100 holding latch door 110 in horizontal position 240 with latch door 110 depicted in phantom.
Figure 23:
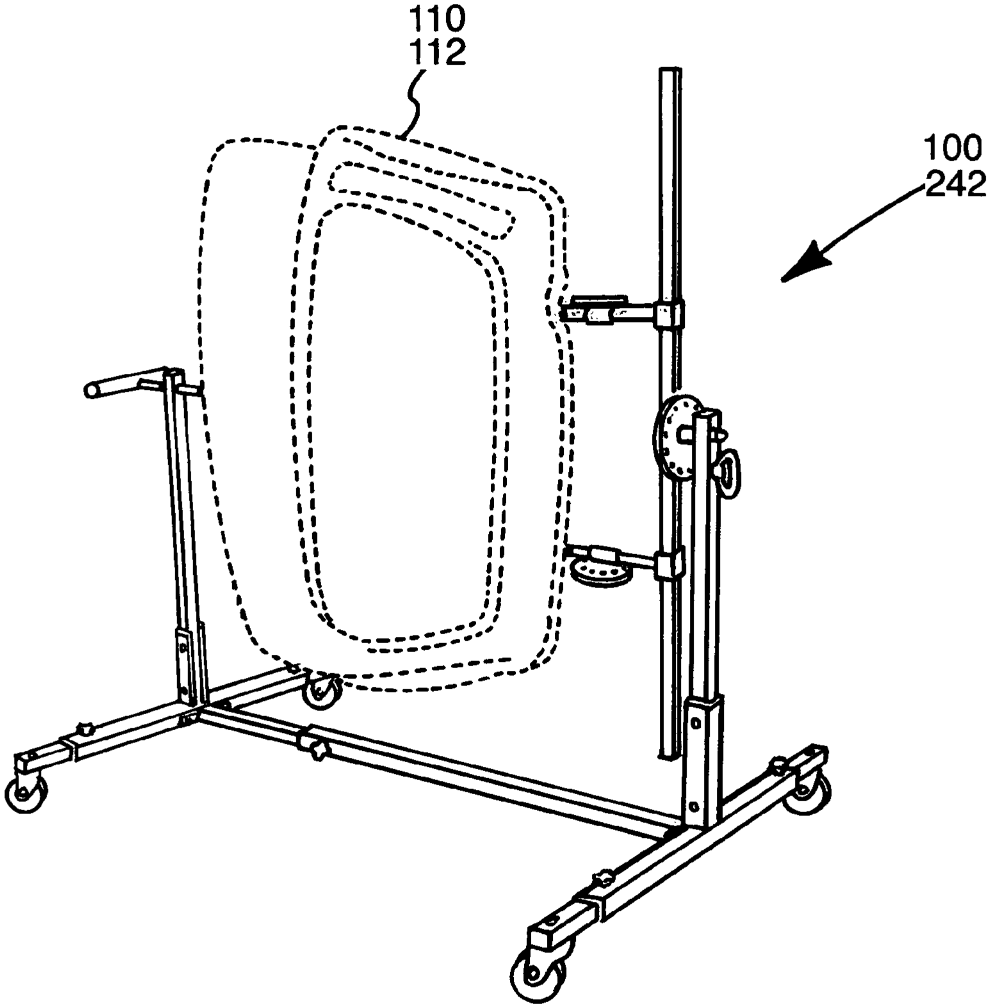
FIG. 23 depicts a front perspective view of spin stand 100 holding latch door 110 in vertical position 242 with latch door 110 being depicted in phantom.
Figure 24:
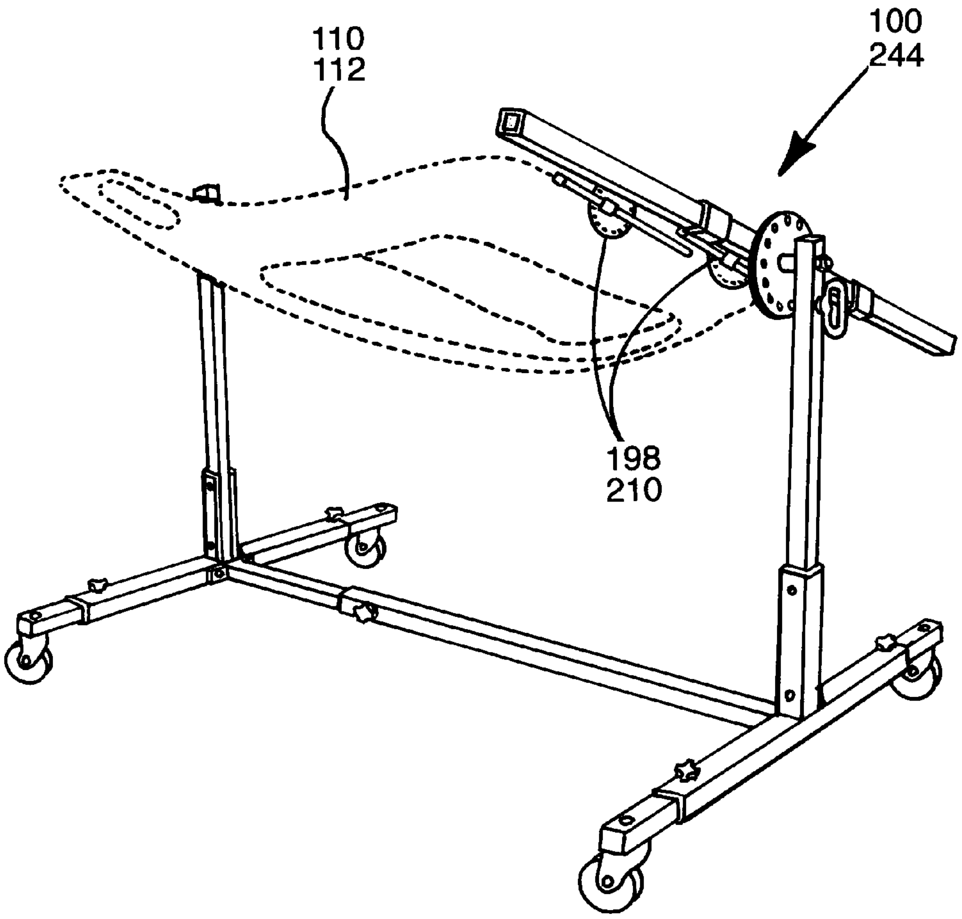
FIG. 24 depicts a front perspective view of spin stand 100 with latch door 110 in oblique position 244 with latch door 110 depicted in phantom.

Now adding FIG. 22, FIG. 23, and FIG. 24 to the consideration, the flexibility and versatility of spin stand 100 can be clearly seen. Spin stand 100 allows latch door 110 or other item 112 to rotate 360 degrees and be locked at any position throughout the continuum. FIG. 22 depicts latch door 110 in horizontal position 240, FIG. 23 depicts latch door 110 in vertical position 242, and FIG. 24 depicts latch door 110 in oblique position 244. This rotation, multitude of positioning apertures 186, and the variety of positions allows every part of latch door 110 or item 112 to be painted without being removed from spin stand 100. Thus, only one drying cycle or period is required.

Figure 25:
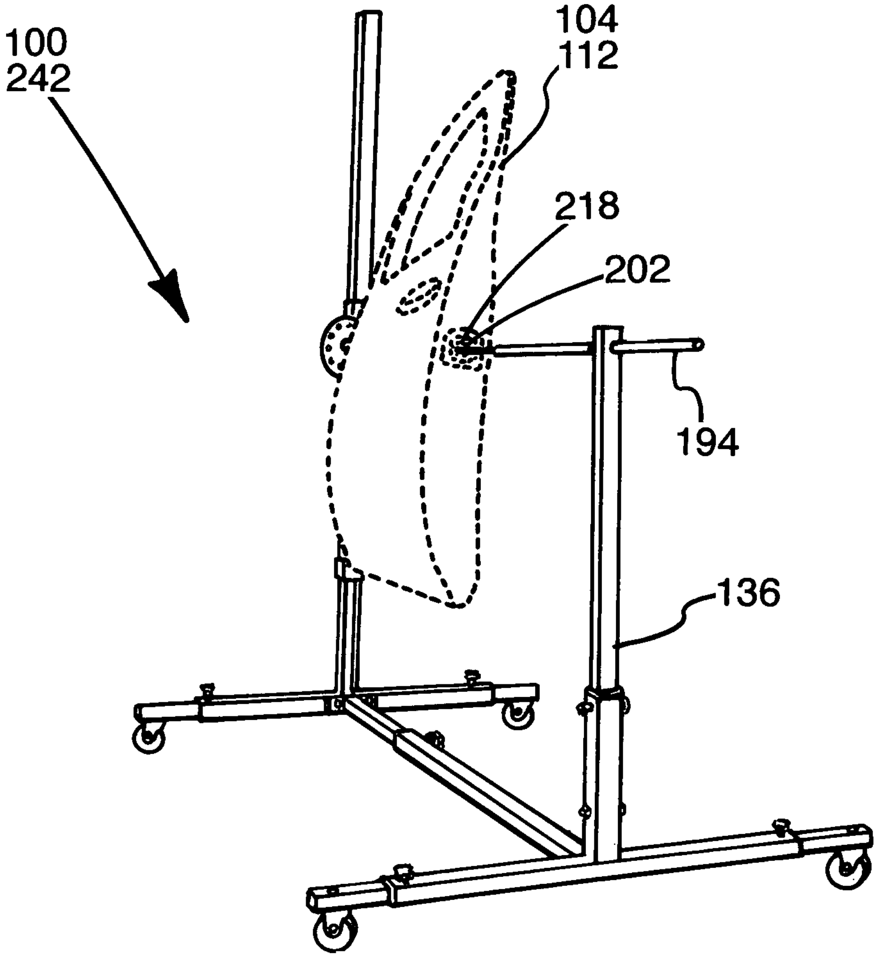
FIG. 25 depicts a left perspective view of spin stand 100 holding door 104 in vertical position 242 with door 104 depicted in phantom.

Now adding FIG. 25 to the consideration, the flexibility of spin stand 100 can be seen. Spin stand 100 is holding door 104 in vertical position 242. In this embodiment, slave side support bar 194 (see FIG. 14) is inserted into accessory aperture 188 on second support post 136. This connection may be secured by bushings 206 (see FIG. 36). Slave side support bar 194 has blind threaded aperture 214. Either right latch bolt 200 (see FIG. 7) or left latch bolt 202 (see FIG. 8) can be fastened into blind threaded aperture 214 and secured by locking nut 216. Right latch bolt 200 or left latch bolt 202 attach to door 104 through door latch 218 to secure it on spin stand 100. Right latch bolt 200 is used when right door 104 is attached to spin stand 100 and left latch bolt 202 is used for left door 104.

Figure 26:
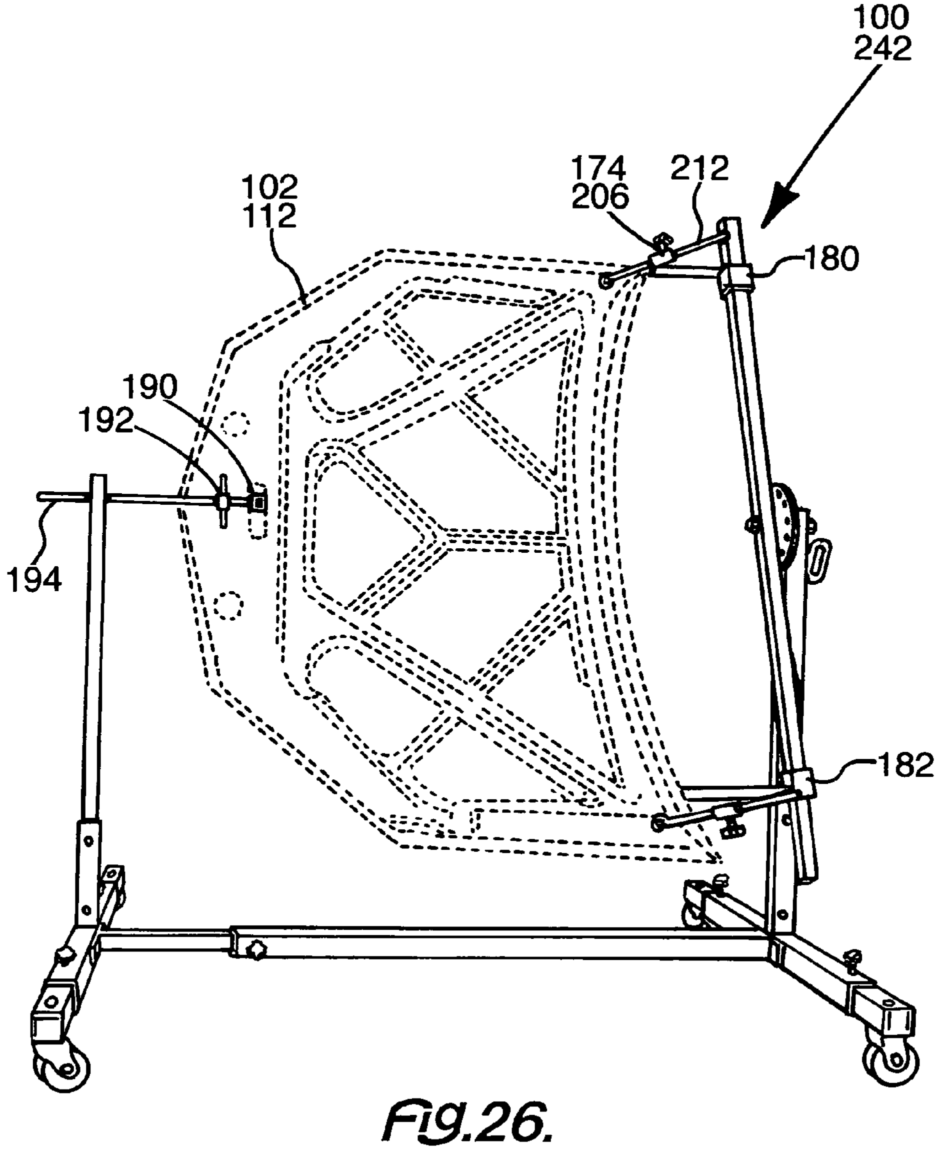
FIG. 26 depicts a front perspective view of spin stand 100 holding hood 102 in vertical position 242 with hood 102 depicted in phantom.
Figure 27:
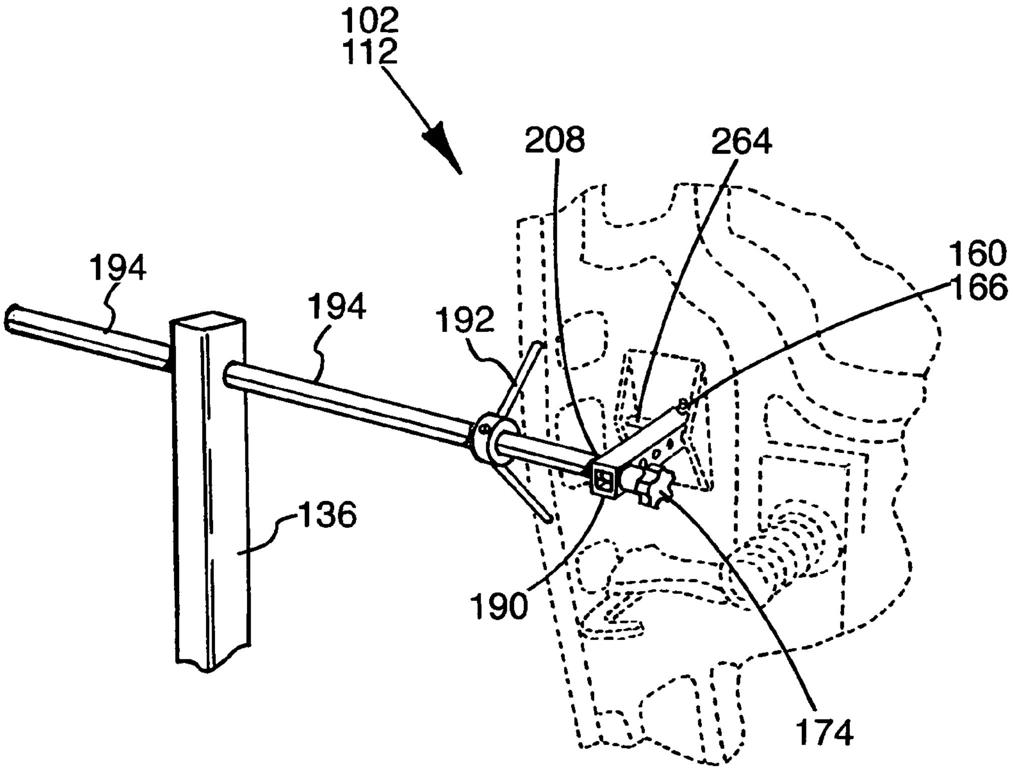
FIG. 27 depicts a front perspective view of spin stand 100 holding hood 102 in horizontal position 240 with hood 102 being depicted in phantom.

Now adding FIG. 26 and FIG. 27 to the consideration, the flexibility of spin stand 100 can be seen. Spin stand 100 is holding hood 102 in vertical position 242. Slave side support bar 194 (see FIG. 14) attaches to second support post 136 through accessory aperture 188. Hood strut 192 (see FIG. 16) and hood latch adapter 190 (see FIG. 13) attach to slave side support bar 194. Hood strut 192 rests against hood 102 to keep the position stable while rotating.

Moreover, hood latch adapter 190 attaches to slave side support bar 194 to further aid in attaching spin stand 100 to hood 102. Hood latch adapter 190 attaches to hood latch 264 and the connection is secured through the cooperation of lock pin 166 and cotter pin 160 with hood latch aperture 266. Hood latch adapter 190 has a series of support bar apertures 268. Locking knob 172 inserts into support bar apertures 268 and cooperates with spring clip 208 (see FIG. 6) to create tension to hold hood 102 or item 112 in a stable and secure position as it is being rotated. In converse, locking knob 172 can be released and releases the tension on spring clip 208 so that these parts can be removed from slave side support bar 194 when the project is finished. The series of support bar apertures 268 are present to accommodate for different makes, models, and years of hood 102 or item 112.

Figure 28:
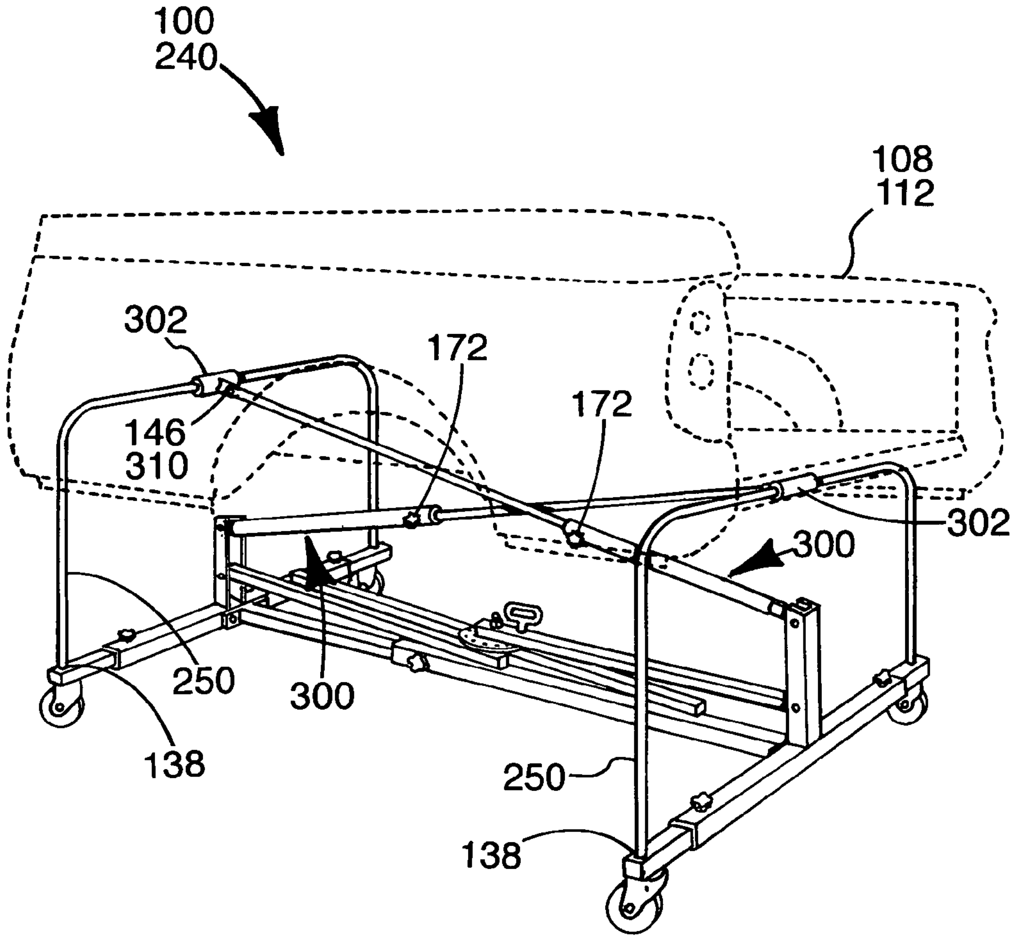
FIG. 28 depicts a front perspective view of spin stand 100 holding truck bed 108 in horizontal position 240 with truck bed 108 being depicted in phantom.
Figure 37:
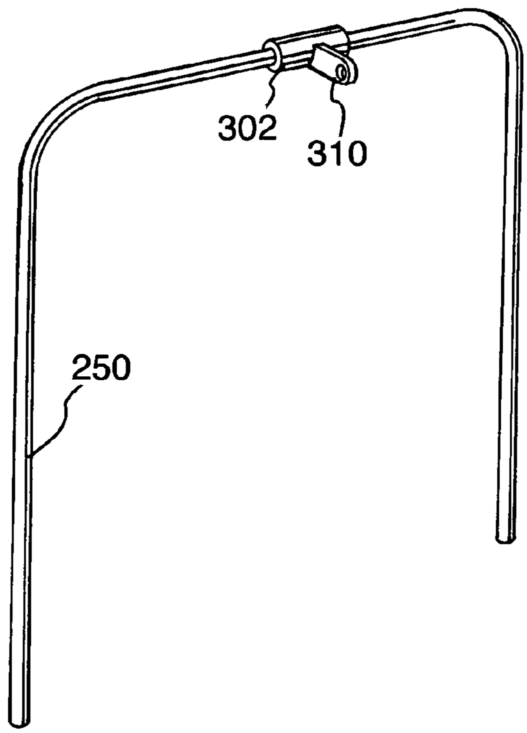
FIG. 37 depicts a front perspective view of U-tube support 250 with bracket bushing 302.
Figure 38:
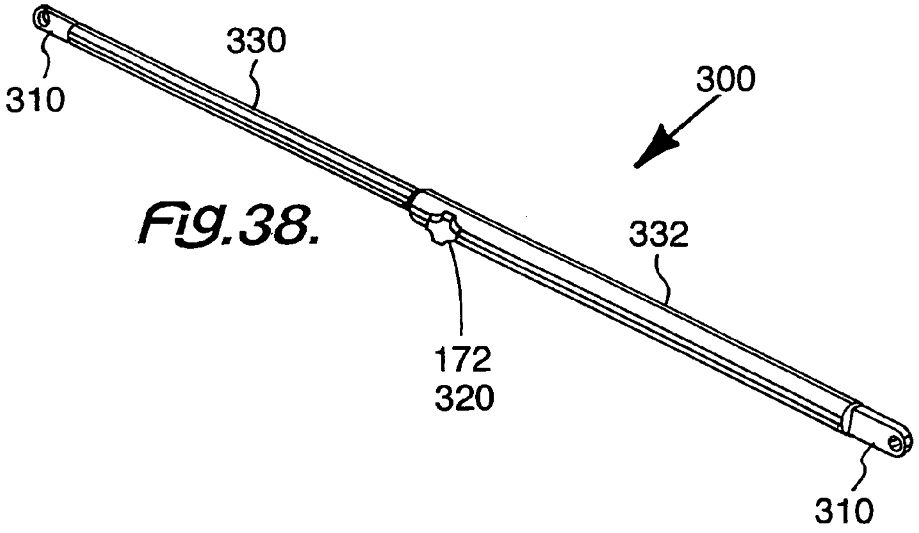
FIG. 38 depicts a front perspective view of adjustable strut 300.

Now adding FIG. 28, FIG. 37, and FIG. 38 to the consideration, the flexibility and structure of spin stand 100 can be seen. Spin stand 100 is holding truck bed 108. The depth and width adjustments of spin stand 100 are increased in proportion to the size of truck bed 108. Two of U-tube supports 250 are added to accommodate the weight, width, and bulkiness of truck bed 108. U-tube supports 250 are attached to left base end 120 and right base end 122 through support apertures 138 in each castor assembly 124. Truck bed 108 rests on U-tube supports 250. Spin stand 100, through the U-tube supports 250, can accommodate for the variety of truck makes, models, and years.

U-tube supports 250 are supported by adjustable struts 300 which prevent supports 250 from wobbling due to the weight of truck bed 108. Adjustable struts 300 are connected to U-tube supports 250 through bracket bushing 302. Bracket bushing 302 attaches to U-tube supports 250 in any suitable and secure fashion including but not limited to welding, sweating, and fasteners. Adjustable struts 300 are telescopic to accommodate a variety of different sizes of truck beds 108. Adjustable struts 300 are held and secured in position through locking knobs 172.

Adjustable struts 300 have mounting tongues 310 which cooperate with fasteners 146 to secure adjustable struts 300 to U-tube supports 250. The attachment between adjustable struts 300 and mounting tongues 310 are more clearly seen in FIG. 37 and FIG. 38. U-tube support 250 has bracket bushing 302. Bracket bushing 302 has mounting tongue 310. Bracket bushing mounting tongue 310 cooperates with adjustable strut mounting tongue 310 through the alignment of apertures. This alignment is secured with fastener 146.

Now referring specifically to FIG. 38, the structure of adjustable strut 300 can be more clearly seen. Adjustable strut 300 has a telescopic sheath 332. Telescopic shaft 330 inserts into or extends from telescopic sheath 332 in a male to female relationship. To make adjustable strut 300 longer, telescopic shaft 330 is extended outward from telescopic sheath 332. To make adjustable strut 300 shorter, telescopic shaft 330 is pushed into telescopic sheath 332. Telescopic sheath 332 has adjustment lock 320 which is similar to locking knob 172. Adjustment lock 320 secures the telescopic shaft 330 in the desired position.

Figure 29:
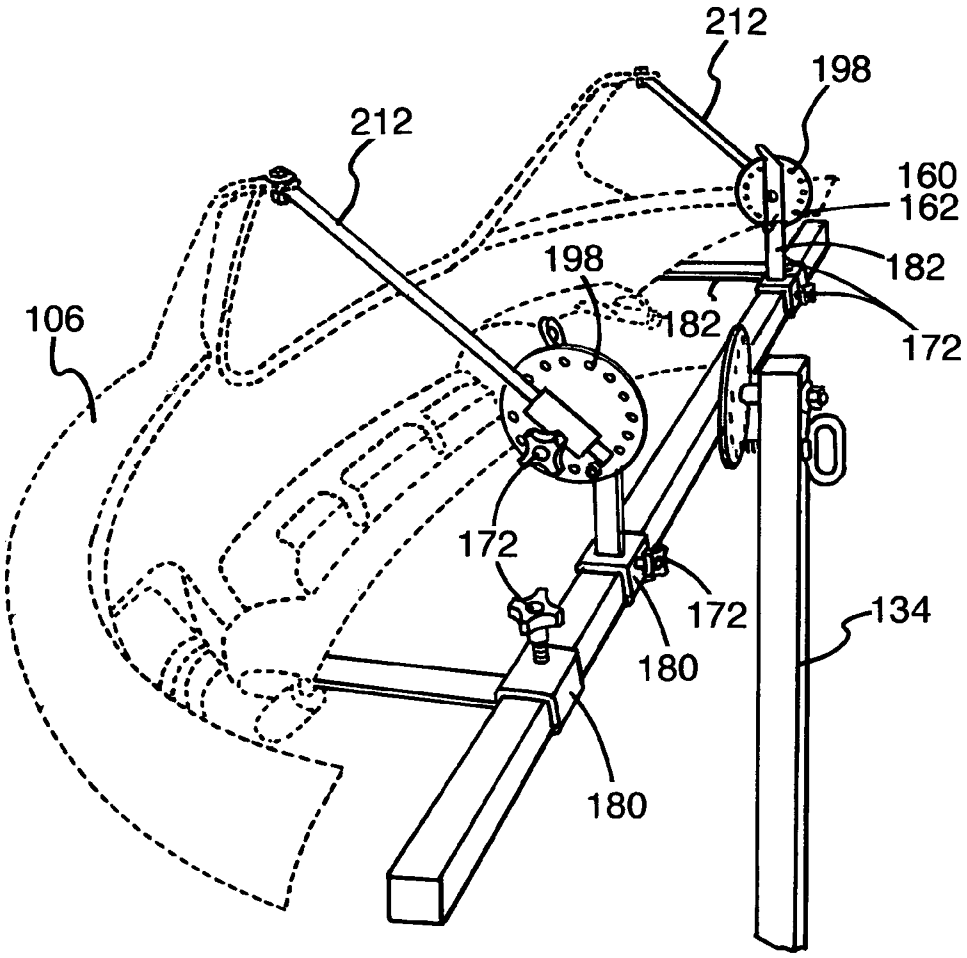
FIG. 29 depicts a front perspective view of spin stand 100 holding bumper 106 in horizontal position 240 with bumper 106 being depicted in phantom.

Now adding FIG. 29 to the consideration, the flexibility and structure of spin stand 100 can be clearly seen. Spin stand 100 is attached to bumper 106. First support post 134 is attached to swing arm 144 as seen in earlier embodiments. In this embodiment, right door hinge mount 180 (see FIG. 20) and left door hinge mount 182 (see FIG. 19) are attached to swing arm 144. Locking knob 172 (see FIG. 18) secures the connection between right door hinge mount 180, left door hinge mount 182, and swing arm 144. Right door hinge mount 180 may attach to the bottom of bumper 106 and be secured with fasteners 146.

Moreover, right door hinge mount 180 (see FIG. 20) and left door hinge mount 182 (see FIG. 19) may have an attached multiple position door hinge mount 198 (see FIG. 21) and be secured in place with locking knob 172. Multiple position door hinge mount 198 may attach to 30 degree door or hood mount 212 (see FIG. 11) as shown. Or, multiple position door hinge mount 198 may attach to flat door or hood mount 210 (see FIG. 10) or 90 degree door or hood mount 222 (see FIG. 12) depending on the make, model or year of the bumper 106. Door or hood mounts 210, 212, and 222 attach to the top of bumper 106 and are secured with fasteners 146.

Figure 30:
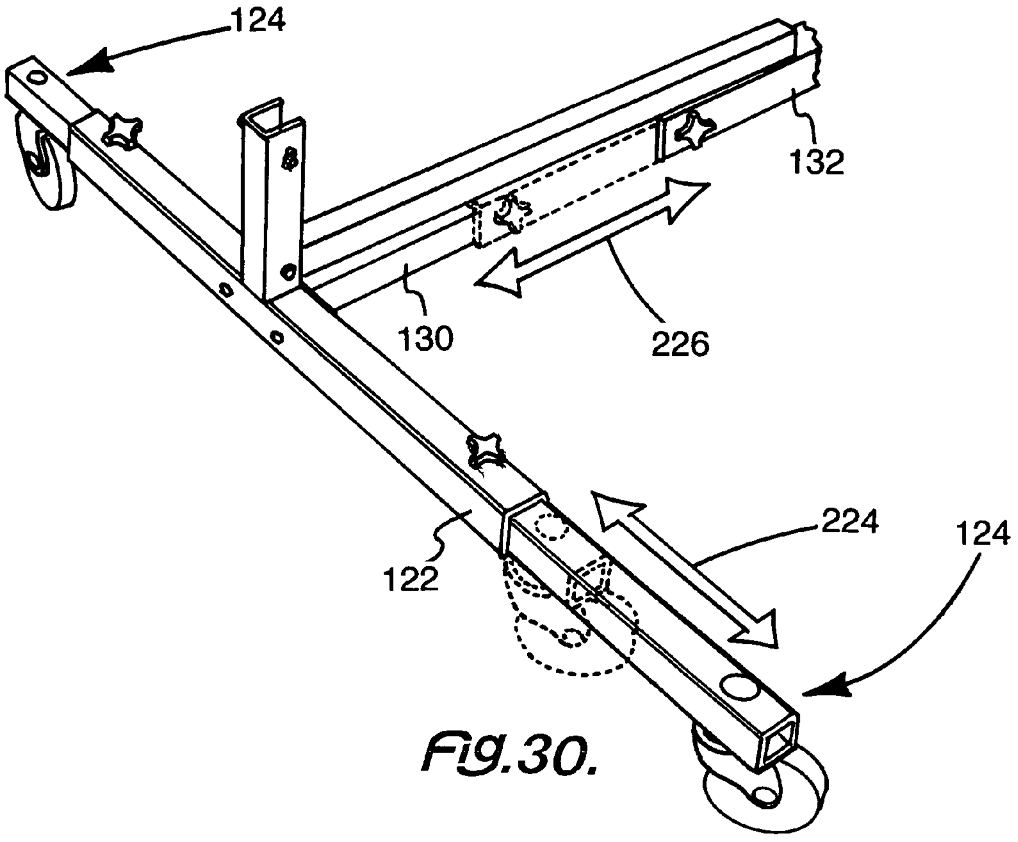
FIG. 30 depicts a top perspective view of spin stand 100 indicating width profile 224 and depth profile 226 adjustment capabilities.

Now adding FIG. 30 to the consideration, the expandability and flexibility of spin stand 100 can be clearly seen. Width 224 and depth 226 may expand to accommodate heavier or bulkier items 112.

To expand width 224 of spin stand 100, the distance castor assembly 124 is inserted into left base end 120 or right base end 122 is decreased and the inverse action decreases width 224. To expand depth 226 of spin stand 100, the distance inner center support 130 is inserted into outer center support 132 is decreased and the inverse action decreases depth 226. Thus, spin stand 100 has great flexibility to accommodate a wide range of items 112.

Figure 31:
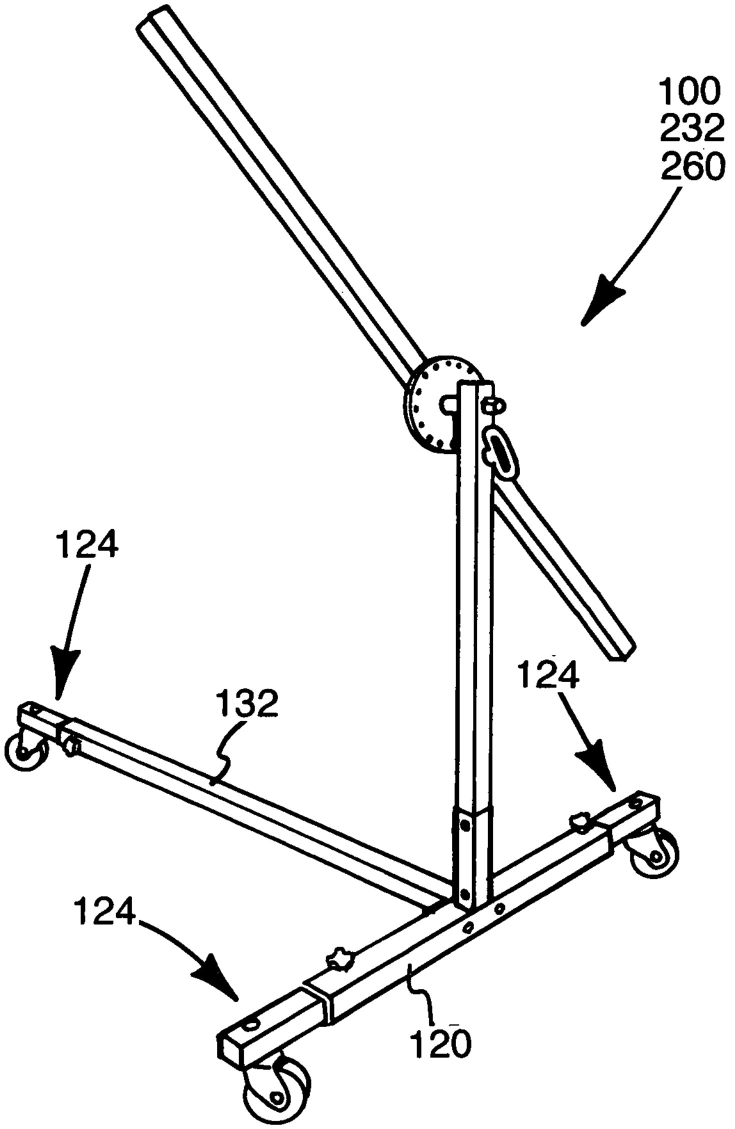
FIG. 31 depicts a side perspective view of the three castor configuration 260 of spin stand 100.

Now adding FIG. 31 to the consideration, the three castor configuration 260 of spin stand 100 can be clearly seen. In this embodiment, left base end 120 has two castor assemblies 124. However left hand assembly 230 is removed and replaced with castor assembly 124 which is attached to outer center support 132. As seen in earlier embodiments, width 224 of spin stand 100 can be increased or decreased based on the requirements of item 112. Three castor configuration 260 has greater maneuverability and requires less storage space during a drying cycle or period.

Figure 32:
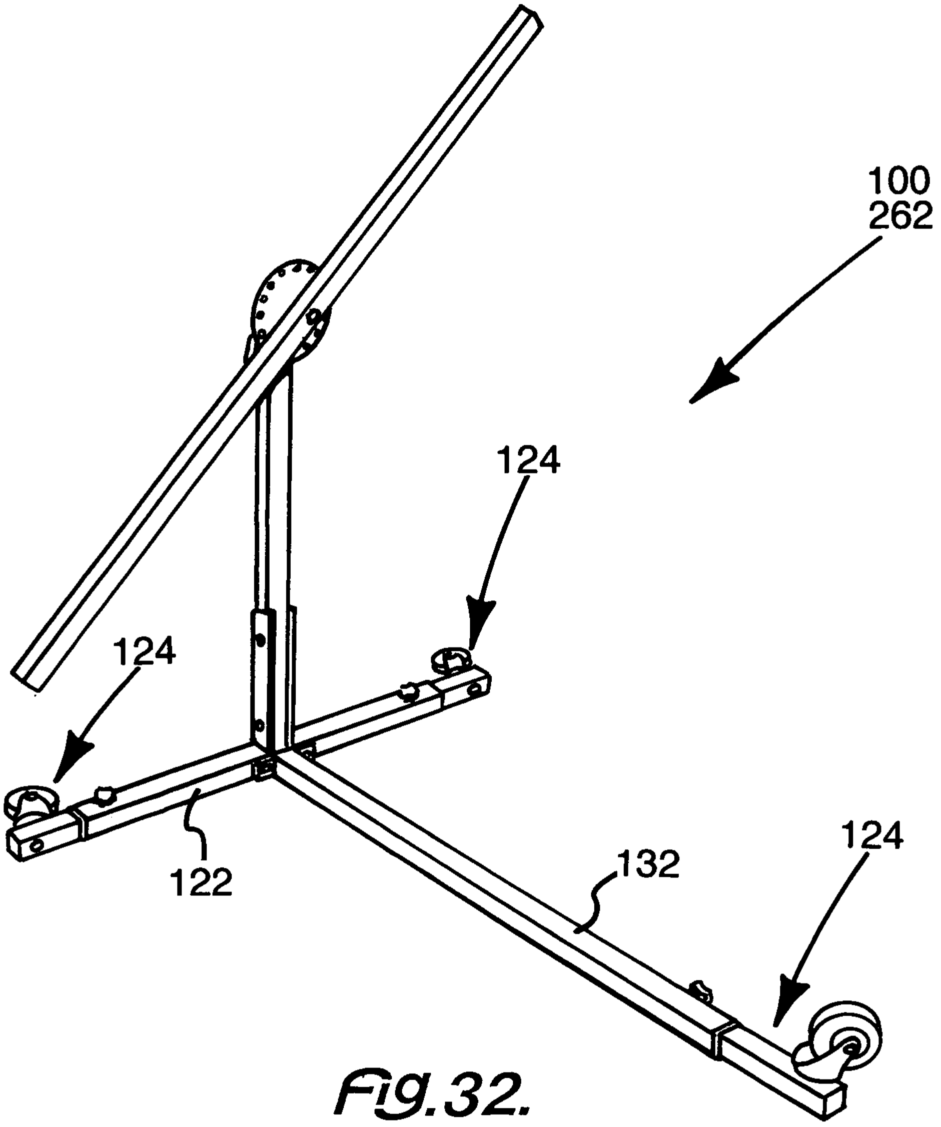
FIG. 32 depicts a side perspective view of spin stand 100 in flat fixed position 262.

Now adding FIG. 32 to consideration, the structure and function of flat fixed position 262 of spin stand 100 can be clearly seen. In this particular embodiment, right hand assembly 232 has two castor assemblies 124 connected to right base end 122. Left hand assembly 230 is removed and replaced by a single castor assembly 124 attached to outer center support 132.

Castor assemblies 124 can be rotated from zero to 360 degrees. This rotation allows the right base end 122 and castor assemblies 124 to have the wheels off of the ground and the right base end 122 and castor assemblies 124 are lying flat on the ground. This provides greater security and stability for heavier items 112 and other applications that do not need to move the entirety of spin stand 100.

Again, as seen in FIG. 30, the width profile 224 and depth profile 226 can be increased or decreased depending on the needs of item 112. Also, left hand assembly 230 can be in place and right hand assembly 232 can be replaced with a single castor assembly 124. Finally, right hand assembly 232 and left hand assembly 230 can both remain in place and four castor assemblies 124 can be present and flat fixed position 262 can still be achieved.

Figure 33:
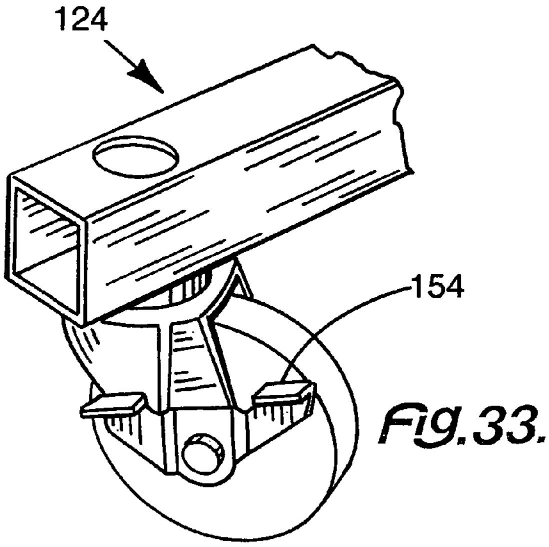
FIG. 33 depicts a side perspective view of castor assembly 124.

Now adding FIG. 33 to the consideration, the structure of castor assembly 124, suitable for use in spin stand 100, can be clearly seen. Castor assembly 124 has wheel lock 154. Wheel lock 154 is released when spin stand 100 needs to be moved. Once spin stand 100 is in the desired location, wheel lock 154 is engaged to provide stability and security so that item 112 can be repaired or painted safely and easily.

Figure 34:
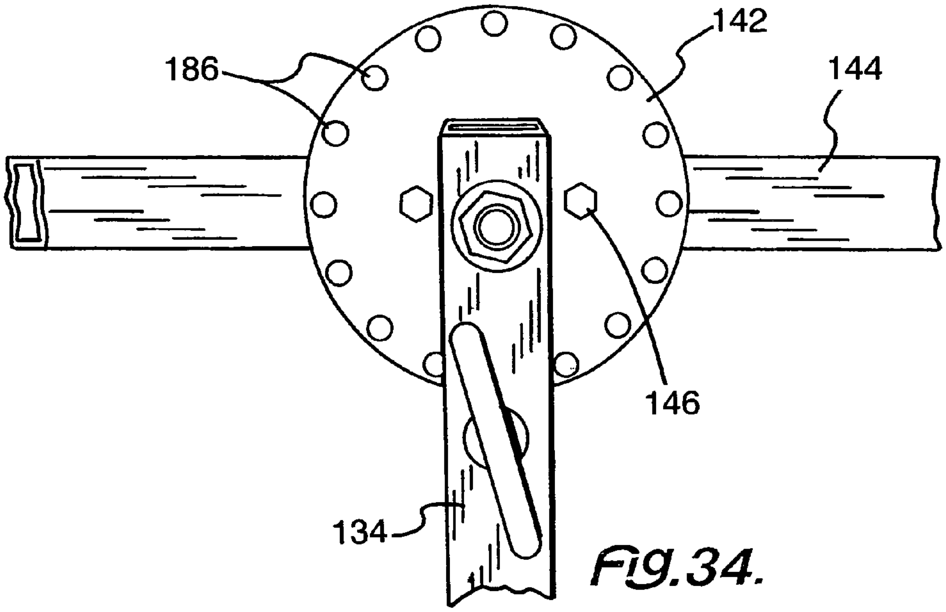
FIG. 34 depicts the right side view of spin stand 100 featuring positioning disk 142.

Now adding FIG. 34 to the consideration, the structure and function of positioning disk 142 can be clearly seen. Positioning disk 142 has a series of positioning apertures 186 which cooperate with hitch pin 140 to hold swing arm 144 in a desired position. Fasteners 146 attach positioning disk 142 to swing arm 144. The cooperation between positioning disk 142, swing arm 144, and hitch pin 140 allow for the horizontal position 240, vertical position 242, oblique position 244, and the multitude of positions in between. These positions 240, 242, 244, and the variety of others, allow item 112 to be rotated, placed in a variety of positions, and have every portion painted without the need to remove item 112 from spin stand 100 or use multiple drying cycles or periods.

Figure 35:
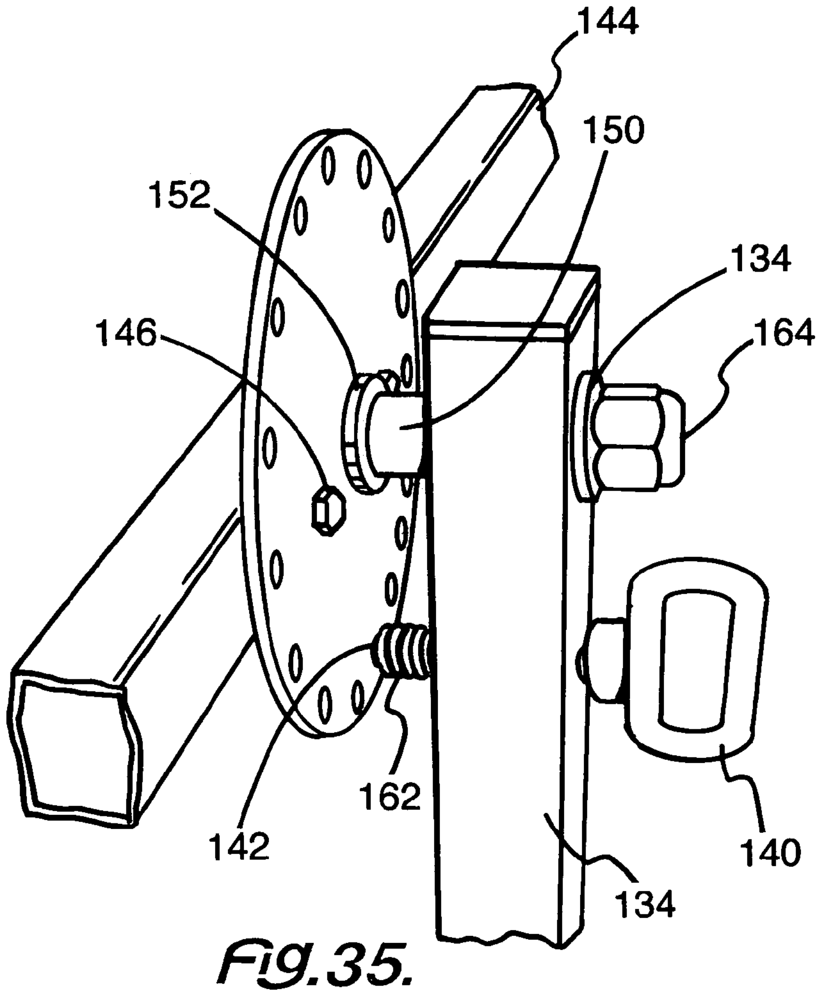
FIG. 35 depicts a side perspective view of positioning disk 142 with swing arm 144 in horizontal position 240 and the cooperation between hitch pin 140 and spring 162.

Now adding FIG. 35 to the consideration, the structure and connection of positioning disk 142, swing arm 144, and hitch pin 140 can be clearly seen. First support post 134 attaches to positioning disk 142 and swing arm 144 through fastener 146. Fastener 146 has a series of washers 152 to aid the connection with fastener 146 and spacer bushing 150 to add security and stability.

Positioning disk 142 has a series of positioning apertures 186 to accommodate for horizontal position 240, vertical position 242, and oblique position 244, and the multitude of other positions. When hitch pin 140 is pulled outward from first support post 134, it compresses spring 162 and releases hitch pin 140 from positioning aperture 186 on positioning disk 142. In converse, when hitch pin 140 is pushed inward toward first support post 134, spring 162 is released and hitch pin 140 inserts into the desired positioning aperture 186. This secures the positioning disk 142 in a stable position and allows item 112 to be securely held in the desired position. Thus, great flexibility and function can be achieved.

This application taken as a whole with the abstract, specification, claims, and drawings being combined; provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A spin stand device for painting a vehicle body part comprising:

the spin stand device having an adjustable base frame to allow for width and depth profile adjustments;

at least one mounting accessory for the spin stand;

the at least one mounting accessory adapting the spin stand to be used with the vehicle auto body part being painted;

the spin stand device having a left base end, a right base end, a left hand assembly and a right hand assembly;

the left hand assembly and the right hand assembly cooperating to hold the vehicle body part;

the left base end having an inner center support extending perpendicularly from the side thereof;

the right base end having an outer center support extending perpendicularly from the side thereof;

the inner center support inserting into the outer center support to connect the left hand assembly to the right hand assembly;

a base locking knob connecting the inner center support and the outer center support;

the inner center support adjusting with the outer center support to compensate for a different size of the vehicle part;

the spin stand device having an increased depth to account for a larger item of the vehicle part decreasing a distance the inner center support is inserted into the outer center support;

the spin stand device having the decreased depth to account for a smaller item of the vehicle part by increasing a distance the inner center support is inserted into outer center support;

the left hand assembly having a left base end;

the left base end having a castor assembly on opposing ends thereof;

a second support post bracket attaching perpendicularly to the left base end on an upper side thereof;

a second support post fitting with the second support post bracket in a male to female relationship;

the second support post being secured to the second support cost bracket through a hinge bolt with a hinge nut and a lock pin with a cotter pin;

a use position for the spin stand device being achieved when both the hinge bolt and the hinge nut, and the lock pin and the cotter pin are secured in place;

a stored position for the spin stand device being achieved with only the hinge bolt and hinge nut in place so that the second support post may fold downwardly;

a base locking knob cooperating with the castor assembly to allow the castor assembly to be moved outwardly to increase a width profile to add stability and security for a larger item;

the base locking knob cooperating with the castor assembly to allow the castor assembly to be moved inwardly to decrease the width profile to provide more flexibility and maneuverability for a smaller item;

the right hand assembly having a right base end;

the castor assembly inserting into each of the oppositely disposing ends of the right base end;

a base locking knob securing the castor assembly;

a width profile being adjustable by increasing or decreasing the distance the castor assembly is inserted into the right base end;

the right base end having a first support post bracket extending perpendicularly, from a top side thereof;

a first support post joining the first support post bracket in a male to female relationship;

the first support post being secured to a first support post bracket through the cooperation of a hinge bolt with a hinge nut, and a lock pin, with a cotter pin;

the first support post attaching to a swing arm;

a positioning disk attaching to the swing arm;

the swing arm attaching to the positioning disk and the first support post;

a hitch pin being inserted into the first support post through a pin aperture and through the positioning disk through a positioning disk aperture;

the positioning disk being adjusted to a desired position, thereby permitting the item being painted to be rotated and properly positioned for complete painting;

the item being rotatable on the spin stand device in order to be painted completely with only one drying cycle;

the positioning disk having a series of positioning disk apertures;

the positioning disk apertures cooperating with the hitch pin to hold the swing arm in a desired position;

at least one fastener attaching the positioning disk to the swing arm;

the cooperation between the positioning disk, the swing arm, and the hitch pin allowing for movement between the desired positions to paint the item in one step;

the first support post attaching to the positioning disk and the swing arm through the at least one fastener;

the at least one fastener having a series of washers to aid the connection with the at least one fastener and a spacer bushing to add security and stability; and the second support post receiving at least one accessory.

2. The spin stand device of claim 1 further comprising:

a) the second support post having an accessory aperture to receive the at least one accessory;

b) a hood mount being attachable to the second support post through the accessory aperture; and c) a slave side support bar being attached to the second support post through cooperation with the accessory aperture.

3. The spin stand device of claim 1 further comprising:

a) the spin stand device being adapted to hold a vehicle door;

b) the accessory being inserted into an accessory aperture on the second support post;

c) at least one bushing supporting the accessory and the accessory aperture on the second support post;

d) a right latch bolt or a left latch bolt being fastened into the accessory aperture or the slave side support bar and secured by a locking nut;

e) the right latch bolt or the left latch bolt attaching to the door through a door latch to secure the door the on the spin stand device;

f) the right latch bolt being used for a right door attachment to the spin stand device; and g) the left latch bolt being used for a left door attachment to the spin stand device.

4. The spin stand device of claim 1 further comprising:

a) the spin stand device being adapted to hold a hood;

b) the accessory attaching to the second support post through the accessory aperture;

c) the accessory being secured in place with at least one bushing;

d) a hood strut and a hood latch adapter attaching to the second support post through the slave side support bar;

e) the hood strut resting against the hood to keep a stable position while rotating;

f) the hood latch adapter attaching to the second support post through the slave side support bar to further aid in attaching the spin stand device to the hood;

g) the hood latch adapter attaching to a hood latch through the cooperation of a lock pin and a cotter pin with a hood latch aperture;

h) the hood latch adapter having a series of support bar apertures;
i) a locking knob inserting into at least one selected member of the support bar apertures;
j) a mount locking knob cooperating with a spring clip to create tension to hold the item stable;
k) the mount locking knob permitting a controlled release of tension on the spring clip so that the item can be removed from the second support post; and
l) the series of support bar apertures accommodating for different makes, models, and years of the hood.

5. The spin stand device of claim 1 further comprising:
a) the spin stand device being adapted to hold a truck bed;
b) the depth and width adjustments of the spin stand being increased;
c) at least one U-tube support being added to accommodate the truck bed;
d) the at least one U-tube support being attached to the left base end or the right base end through support apertures in each of the castor assembly; and
e) the truck bed resting on the at least one U-tube support.

6. The spin stand device of claim 1 further comprising:
a) the spin stand device being adapted to attach to a bumper;
b) the first support post being attached to the swing arm;
c) a right hinge mount and left hinge mount being attached to swing arm; and
d) a locking knob securing the right hinge mount, the left hinge mount, and the swing arm.

7. The spin stand device of claim 6 further comprising:
a) the spin stand device having the right hinge mount and the left hinge mount;
b) the right hinge mount and the left hinge mount having an attached multiple position door hinge mount; and
c) the multiple position door hinge mount being attachable to a 30 degree door or hood mount, a 90 degree door or hood mount, or a flat door or hood mount, depending on the make, model or year of the bumper.

8. The spin stand device of claim 1 further comprising:
a) the spin stand device including an expansion for width and depth, in order to accommodate a variety of auto body parts;
b) the castor assembly being adjustable relative to the right base to provide for adjustment of width; and
c) the inner center support and the outer center support being adjustable for the depth.

9. The spin stand device of claim 1 further comprising:
a) the spin stand device having a three castor configuration;
b) the right base end having two castor assemblies;
c) the left hand assembly being removed and replaced with a third castor assembly;
d) the third castor assembly being attached to the outer center support; and
e) the three castor configuration providing greater maneuverability and requiring less storage space during a drying cycle or period.

10. The spin stand device of claim 1 further comprising:
a) the spin stand device having a flat fixed position; and
b) the flat fixed position permitting the castor assemblies to be rotated from zero to 360 degrees thereby allowing the right base end and the castor assemblies to have the wheels off of the ground, while the left base end with its castor assemblies are lying flat on the ground with its wheels off the ground in order to provide greater security and stability for heavier items.

11. The spin stand device of claim 1 further comprising:
a) the width profile and the depth profile increasing or decreasing based on the item; and
b) the left hand assembly being in place with the right hand assembly replaced with the single castor assembly, or the right hand assembly and the left hand assembly remaining in place with four of the castor assemblies to achieve the flat fixed position.

12. The spin stand device of claim 1 further comprising:
a) the castor assembly including a wheel lock;
b) the wheel lock being released when the spin stand needs to be moved; and
c) the wheel lock being engaged to provide stability and security so that the item can be repaired or painted safely and easily.

13. The spin stand device of claim 1 further comprising:
a) the spin device including a positioning disk;
b) the positioning disk including a series of positioning apertures;
c) the positioning apertures cooperating with the hitch pin to hold the swing arm in a desired position;
d) at least one fastener attaching the positioning disk to the swing arm; and
e) cooperation between the positioning disk, the swing arm, and the hitch pin allowing for a horizontal position, a vertical position, en oblique position, and the multitude of positions in between in order to allow item to be rotated, placed in a variety of positions, and have every portion painted without the need to remove the item from the spin stand or use multiple drying cycles or periods.

14. The spin stand device of claim 1 further comprising:
a) the first support post attaching to the positioning disk and the swing arm through the at least one fastener;
b) the at least one fastener having at least one washer to aid the connection with the at least one fastener and a spacer bushing to add security and stability; and
c) the positioning disk having a series of positioning apertures to accommodate a horizontal position, a vertical position, and an oblique position, and the multitude of other positions required for painting an item.

15. The spin stand device of claim 14 further comprising:
a) the hitch pin being pulled outwardly from the first support post to thereby compress a spring and release the hitch pin from the positioning disk; and
b) the hitch pin being pushed inwardly toward the first support post to thereby release the spring and insert the hitch pin into a desired positioning aperture in order to secure the positioning disk in a stable position and allow the item to be securely held in the desired position.

* * * * *